United States Patent Office 3,635,967
Patented Jan. 18, 1972

3,635,967
ALPHA-(TERTIARY AMINOMETHYL)-PHENYL-ALPHA PYRIDYL OR C-PIPERIDYL-BENZYL ALCOHOLS
William J. Houlihan, Mountain Lakes, N.J., assignor to Sandoz-Wander, Inc., Hanover, N.J.
No Drawing. Original application Sept. 22, 1966, Ser. No. 581,152, now Patent No. 3,497,508, dated Feb. 24, 1970. Divided and this application Nov. 17, 1969, Ser. No. 877,453
Int. Cl. C07d 87/40
U.S. Cl. 260—247.5 R          8 Claims

ABSTRACT OF THE DISCLOSURE

Pyridyl and piperidyl benzyl alcohols substituted in the α-position with a substituted methylphenyl moiety useful as anti-inflammatories and anti-diabetics are obtained from corresponding benzophenones and a pyridyl lithium compound.

---

This application is a division application of Ser. No. 581,152, filed Sept. 22, 1966, now U.S. Patent 3,497,508, dated Feb. 24, 1970.

This invention relates to derivatives of benzyl alcohol. In particular, the invention pertains to α-[(tertiaryaminomethyl)phenyl]benzyl alcohols which may be additionally substituted in the α-position with a heterocyclic moiety and methods for preparing the same. The invention also relates to intermediates which are useful in preparing the above compounds and processes for preparing said intermediates.

The substituted benzyl alcohols of the present invention are of the general formula

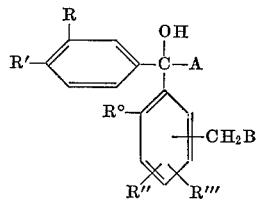

I wherein each of R and R' represents hydrogen; chloro; fluoro; trifluoromethyl; lower alkoxy, preferably containing from 1 to 4 carbon atoms, e.g., methoxy, ethoxy, propoxy and butoxy; or R and R' together form a 3,4-methylenedioxy bridge;

each of R'' and R''' represents hydrogen; chloro; fluoro; trifluoromethyl; lower alkoxy, preferably containing from 1 to 4 carbon atoms, e.g., methoxy, ethoxy, propoxy and butoxy; or R'' and R''' together form a 2,3- or 3,4-methylenedioxy bridge;

R° represents hydrogen only;

A represents hydrogen; pyridyl (2-, 3- or 4-), preferably 2-pyridyl; or piperidyl (2-, 3- or 4-), preferably 2-piperidyl; and B represents di-(straight-chain lower alkyl)amino, each of the lower alkyl substituents being the same or different and preferably containing from 1 to 4 carbon atoms, e.g., methyl, ethyl, propyl and butyl;

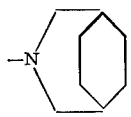

or a saturated monocyclic ring

containing in the ring, in addition to the nitrogen atom, from 4 to 6 carbon atoms or 4 to 5 carbon atoms and one additional hetero atom of the group nitrogen, oxygen and sulfur, e.g., morpholino, homomorpholino, pyrrolidino, piperidino, hexahydroazepino, 4-phenylpiperazino, 4-lower alkylpiperazino and 4-lower alkylhomopiperazino, the lower alkyl substituents of the last two mentioned groups being straight chain and preferably containing from 1 to 4 carbon atoms.

In structural Formula I above and the structural formulas set forth hereinafter, R'', R''' and the substituent —CH₂B may be in any position of the benzene ring other than that occupied by R° except as otherwise specifically provided herein.

The compounds of Formula I wherein A is pyridyl are prepared by reacting an appropriately substituted benzophenone with a lithium derivative of pyridine to form the corresponding α-[(tertiaryaminomethyl)phenyl]-α-pyridyl benzyl alcohol. The compounds of Formula I wherein A is piperidyl are readily obtained by reduction of the corresponding pyridyl derivative. The over-all process is illustrated by the following reaction scheme:

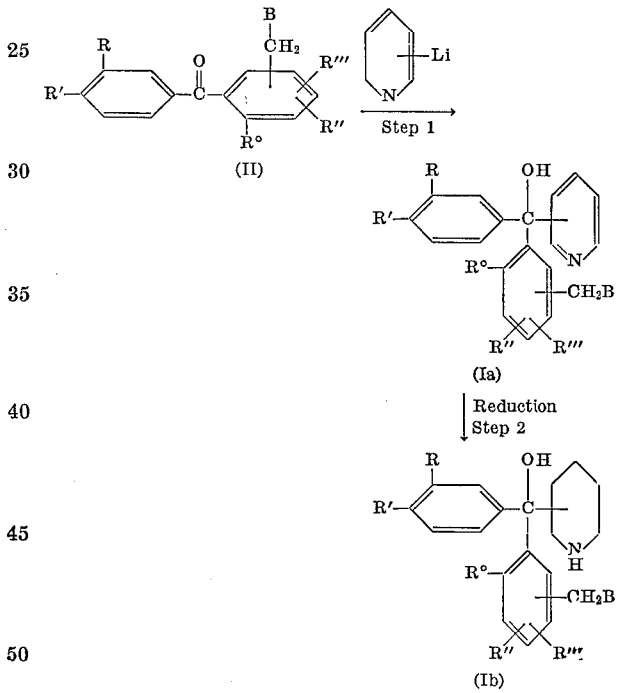

Wherein R, R°, R', R'', R''' and B are as previously defined.

In Step 1 of the process a benzophenone (II) is reacted with a pyridyl lithium compound to form the corresponding pyridyl derivative (Ia). This reaction is carried out in conventional manner employing a suitable inert organic solvent, e.g., diethyl ether, tetrahydrofuran, hexane and heptane, and a reaction temperature of about 20° C. or below. Preferably, the reaction temperature is in the range of from about —20° C. to about —50° C. The resulting pyridyl derivative is readily recovered in conventional manner. The pyridyl lithium reactant employed in this step is readily prepared by reacting an appropriate bromopyridine with butyl lithium in conventional manner.

Step 2 of the process involves the formation of the corresponding piperidyl derivative (Ib) via hydrogenation of the pyridyl derivative (Ia). The hydrogenation is preferably effected catalytically at room temperature (20° C.) employing a suitable inert solvent and catalyst, preferably acetic acid and a platinum catalyst (e.g., PtO₂), and a hydrogen pressure of up to about 50 p.s.i.g. The resulting hydrogenated compounds can be readily recovered in conventional manner.

The compounds of Formula I wherein A is hydrogen are obtained by reduction of an appropriately substituted benzophenone as illustrated by the following reaction scheme:

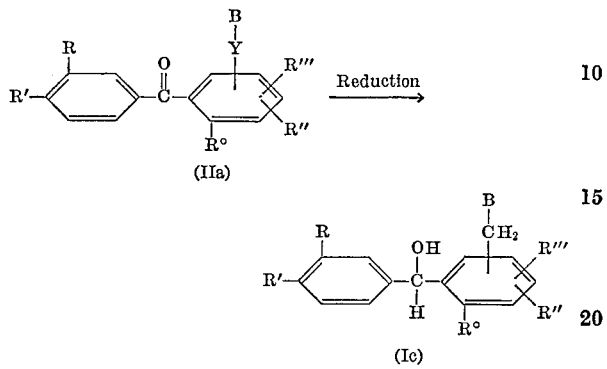

Wherein R, R°, R', R", R''' and B are as previously defined, and Y represents carbonyl (C=O) or methylene (CH₂).

The reduction can be effected chemically in a suitable inert organic solvent, e.g., diethyl ether and tetrahydrofuran, and at elevated temperatures, preferably reflux temperature, employing a hydride reducing agent, e.g., sodium borohydride and lithium aluminum hydride. Alternatively, the reduction may be effected catalytically at room temperature (20° C.) employing a suitable inert solvent, e.g., ethanol and isopropanol, and an appropriate catalyst, e.g., platinum and nickel. The resulting product (Ic) is readily isolated in conventional manner.

The tertiaryaminomethyl substituted benzophenones employed as starting materials in the above processes can be prepared by reacting a methyl substituted benzophenone with a glycol to form the corresponding 2-phenyl-2-tolyl-1,3-diox(ol)ane, converting the latter to the corresponding 2-phenyl - 2 - (halomethylphenyl)-1,3-diox(ol)ane and treating the latter with an appropriate amine. This process is particularly suitable for the preparation of the o-(tertiaryaminomethyl)benzophenones which have heretofore been extremely difficult to obtain by procedures described in the prior art. Alternatively, the starting benzophenones which contain a tertiaryaminomethyl substituent at either the meta or para positions may be prepared by converting a meta or para-substituted methylbenzophenone to the corresponding meta or para-substituted halomethylbenzophenone and treating the latter with an appropriate amine. These processes may be illustrated structurally as follows:

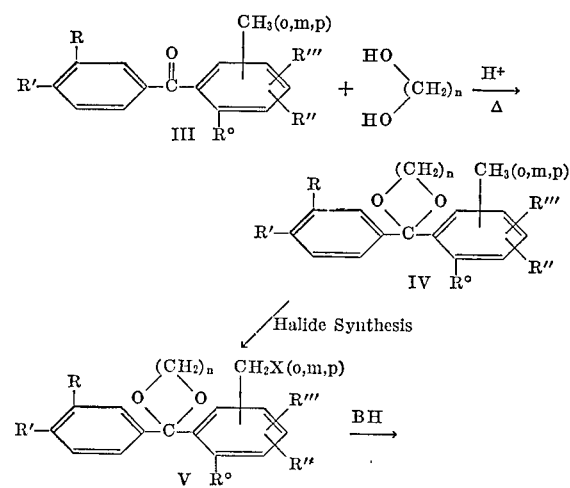

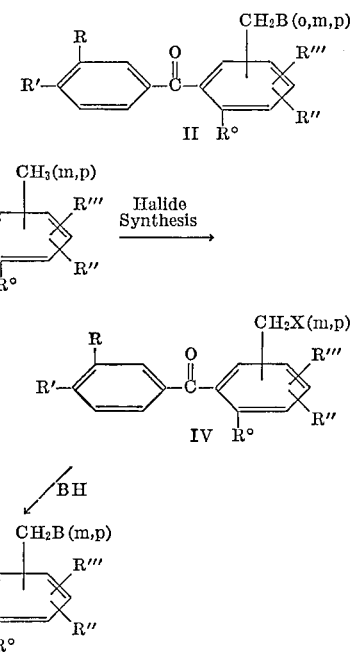

Wherein R, R°, R', R", R''' and B are as previously defined, X represents chloro or bromo and $n$ represents 2 or 3.

The reaction of the benzophenone with the glycol is conveniently carried out in an inet organic solvent, e.g., benzene, toluene, chlorobenzene and hexane, and at room temperature or elevated temperatures up to reflux temperature. Preferably, the reaction is carried out at reflux temperature to facilitate continuous removal of water. To facilitate the formation of water the reaction may be carried out in the presence of a catalytic amount of hydrogen ions such as by the use of a mineral acid, e.g., sulfuric acid, or organic acid, e.g., benzene sulfonic acid and p-toluenesulfonic acid.

Conversion of the 1,3-diox(ol)ane (IV) or benzophenone (IIIa) to the corresponding 1,3-diox(ol)ane (V) or halomethylbenzophenone (VI), respectively, is accomplished via halide synthesis employing chlorine, bromine or other positive halogen source, e.g., N-bromosuccinimide, N-chlorophthalimide and N-bromo-N-methylacetamide. The reaction is carried out at elevated temperatures, preferably reflux temperature, and in a suitable inert organic solvent. When chlorine or bromine is employed, the reaction is desirably carried out in a solvent, such as carbon tetrachloride, and in the presence of sunlight or artificial sun source. With the other above-mentioned reagents the reaction is conveniently effected in a solvent, such as carbon tetrachloride or chloroform and in the presence of sunlight or a peroxide initiator, e.g., benzoyl peroxide.

The reaction of the 1,3-diox(ol)ane (V) or halomethylbenzophenone (VI) with the amine (BH) is readily carried out in conventional manner at room temperature or below employing a suitable inert organic solvent, e.g., carbon tetrachloride, dichloromethane and hexane, as the reaction medium.

Various of the methyl substituted benzophenones (III) employed above are known and can be prepared as described in the literature. Such others which may not be specifically known can be prepared from available materials in analogous manner.

Various of the benzophenones of Formula IIa wherein Y is carbonyl are likewise known and can be prepared as described in the literature. Such others which may not be specifically described in the literature may be prepared from available material in similar manner to that described in the literature for preparing the known compounds.

The compounds of Formula I exist in racemic form or in the form of optically active isomers. The separation and recovery of the respective isomers may be readily accomplished employing conventional techniques and such isomers are included within the scope of this invention.

The compounds represented by structural Formula I are usefule because they possess pharmacological activity. In particular, the compounds are useful as anti-inflammatories, and anti-diabetics. For the above uses the compounds may be combined with a conventional pharmaceutical carrier, and other adjuvants, if necessary, and administered orally in such forms as tablets, capsules, elixirs, suspensions and solutions or parenterally in such forms as injectable solutions, suspensions and emulsions. Furthermore, the compounds may be similarly administered in the form of their non-toxic, pharmaceutically acceptable acid addition or quaternary salts. Such salts do not materially differ from the free base in their pharmacological effects, and are included within the scope of the invention. Representative of the acid addition salts are the mineral acid salts such as the hydrochloride, hydrobromide, sulfate, phosphate and the like and the organic acid salts such as the succinate, benzoate, acetate, maleate, p-toluenesulfonate, benzenesulfonate and the like. Exemplary of the quaternary salts are those derived from common quaternizing agents such as straight-chain lower alkyl halides, preferably containing from 1 to 4 carbon atoms, e.g. methyl bromide, ethyl bromide, methyl iodide and ethyl iodide, and straight-chain di-(lower) alkyl sulfates, e.g., dimethyl sulfate. Such salts are readily prepared from the free base by reacting the base with pharmacologically-acceptable acids or quaternizing agents in conventional manner.

Furthermore, as noted above, the compounds of Formula I exist as optical isomers. In some cases greater pharmacological activity or other beneficial attribute may be found for a particular isomer and in such instances administration of such isomer may be preferred.

For the above-mentioned uses, the dosage administered will, of course, vary depending on the compound employed, mode of administration and treatment intended. However, in general, satisfactory results are obtained when administered at a daily dosage of from about 100 milligrams to about 800 milligrams, preferably given in divided doses throughout the day or in sustained release form.

A representative formulation of the present invention is a tablet prepared by conventional tabletting techniques containing the following ingredients:

| Ingredient: | Parts by weight |
|---|---|
| α[2-(morpolinomethyl)phenyl]-α-(2-piperidyl) benzyl alcohol | 40 |
| Tragacanth | 2 |
| Lactose | 49.5 |
| Corn starch | 5 |
| Talcum | 3 |
| Magnesium stearate | 0.5 |

The compounds of Formula II in addition to being useful as intermediates also possess anti-inflammatory activity and these compounds (in their free base form or as acid addition or quaternary salts) can be formulated and administered in the same manner as previously indicated for compounds of Formula I.

The following examples show representative compounds contemplated by this invention and the manner in which such compounds are prepared. However, it is to be understood that these examples are intended for purposes of illustration only and are not intended as in any way limiting the scope of the invention which is defined in the appended claims.

EXAMPLE 1

α-[4-morpholinomethyl)phenyl]-α-(2-pyridyl)benzyl alcohol

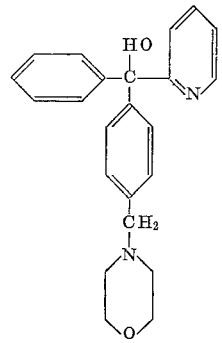

STEP A.—PREPARATION OF 4-BROMOMETHYL BENZOPHENONE

To a flask equipped with a condenser, stirrer, dropping funnel and gas outlet tube is added 40 g. (0.20 mole) of 4-methylbenzophenone, 22.5 (0.27 mole) of sodium bicarbonate and 250 ml. of carbon tetrachloride. The resulting mixture is stirred and irradiated with an artificial daylight source ("Sun Gun") and then 10.9 ml. (0.22 mole) of bromine in 90 ml. of carbon tetrachloride is added dropwise. The mixture is refluxed until the color has faded and the refluxing continued for an additional two hours thereafter. The resulting mixture is filtered, and the solvent removed from the filtrate in vacuo on a rotary evaporater to obtain 4-bromomethylbenzophenone.

STEP B.—PREPARATION OF 4-MORPHOLINOMETHYL BENZOPHENONE

To a cooled solution of 31.5 g. of 4-bromomethyl-benzophenone in 150 ml. of methylene chloride is added dropwise a solution of 19.9 g. of morpholine in 100 ml. of methylene chloride. The mixture is stirred overnight at room temperature, then filtered and the methylene chloride layer extracted with 2 N hydrochloric acid. The acidic extract is then made basic by the addition of solid sodium carbonate and then extracted with chloroform. The chloroform layer is washed with water, dried over magnesium sulfate and filtered. The filtrate is concentrated on a rotary evaporater to obtain 4-morpholinomethylbenzophenone. The free base is dissolved in methanol, the resulting solution saturated with hydrogen chloride gas and then treated with anhydrous diethyl ether and then filtered to obtain 4-morpholinomethylbenzophenone hydrochloride, M.P. 194–196° C.

STEP C.—PREPARATION OF α-[4-(MORPHOLINOMETHYL)PHENYL]-α-(2-PYRIDYL)BENZYL ALCOHOL

To a flask equipped with a stirrer, condenser, thermometer, dropping funnel and gas inlet tube is added, under a nitrogen atmosphere, 260 ml. (0.6 mole) of 15% n-butyllithium in hexane and 140 ml. of anhydrous diethyl ether. The resulting mixture is cooled in a Dry Ice-acetone bath to an internal temperature of −45° C. and then a solution of 83 g. (0.525 mole) of 2-bromopyridine in 110 ml. of diethyl ether is added over a period of 15 minutes. The resulting mixture is stirred for 10 minutes and then a solution of 42.2 g. (0.15 mole) of 4-morpholinomethylbenzophenone in 400 ml. of diethyl ether is added over a 20 minute period. The cooling bath is then removed and when the internal temperature reaches about −15° C., a solution of 500 ml. of 2 N hydrochloric acid and 250 ml. of water is added dropwise. The aqueous layer is then separated, made basic with concentrated ammonia and extracted with chloroform. The chloroform extract is washed with water, dried over magnesium sulfate and evaporated. The residue is chromatographed on a silica gel column to obtain α-[4-(morpholinomethyl)-phenyl]-α-(2-pyridyl)benzyl alcohol, M.P. 139–141° C.

A solution of 10 g. of the free base in chloroform is treated with hydrogen chloride gas, and the resulting solids filtered off to obtain α-[4-(morpholinomethyl)phenyl]-α-(2-pyridyl)benzyl alcohol monohydrochloride which decomposes at 140° C.

EXAMPLE 2

α-[3-(morpholinomethyl)phenyl]-α-(2-pyridyl)benzyl alcohol

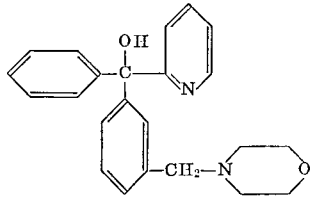

STEP A.—PREPARATION OF 3-BROMOMETHYL-BENZOPHENONE

To a flask equipped with a condenser, stirrer, dropping funnel and gas outlet tube is added 50 g. (0.26 mole) of 3-methylbenzophenone, 28.3 g. (0.34 mole) of sodium bicarbonate and 310 ml. of carbon tetrachloride. The resulting mixture is stirred and irradiated with an artificial daylight source ("Sun Gun") and then 10.9 ml. (0.22 mole) of bromine in 90 ml. of carbon tetrachloride is added dropwise. The mixture is refluxed until the color has faded, and the refluxing continued for an additional two hours thereafter. The resulting mixture is filtered, and the solvent removed from the filtrate in vacuo on a rotary evaporator to obtain 3-bromomethylbenzophenone.

STEP B.—PREPARATION OF 3-MORPHOLINOMETHYL-BENZOPHENONE

To a cooled solution of 40 g. of 3-bromomethylbenzophenone in 200 ml. of methylene chloride is added dropwise a solution of 25.3 g. of morpholine in 120 ml. of methylene chloride. The mixture is stirred overnight at room temperature, then filtered and the methylene chloride layer extracted with 2 N hydrochloric acid. The acidic extract is then made basic by the addition of solid sodium carbonate and then extracted with chloroform. The chloroform layer is washed with water, dried over magnesium sulfate and filtered. The filtrate is concentrated on a rotary evaporator to obtain 3-morpholinomethylbenzophenone. The free base is dissolved in methanol, the resulting solution saturated with hydrogen chloride gas and then treated with anhydrous diethyl ether and then filtered to obtain 3-morpholinomethylbenzophenone hydrochloride, M.P. 241–243° C. (after recrystallization from methanol/diethyl ether).

STEP C.—PREPARATION OF α-[3-(MORPHOLINOMETHYL)PHENYL]-α-(2-PYRIDYL)BENZYL ALCOHOL

To a flask equipped with a stirrer, condenser, thermometer, dropping funnel and gas inlet tube is added, under a nitrogen atmosphere, 260 ml. (0.6 mole) of 15% n-butyllithium in hexane and 140 ml. of anhydrous diethyl ether. The resulting mixture is cooled in a Dry Ice-acetone bath to an internal temperature of —45° C. and then a solution of 83 g. (0.525 mole) of 2-bromopyridine in 110 ml. of diethyl ether is added over a period of 15 minutes. The resulting mixture is stirred for 10 minutes and then a solution of 42.2 g. (0.15 mole) of 3-morpholinomethylbenzophenone in 150 ml. of diethyl ether is added over a 20 minute period. The cooling bath is then removed and when the internal temperature reaches about —15° C., a solution of 500 ml. of 2 N hydrochloric acid and 250 ml. of water is added dropwise. The aqueous layer is then separated, made basic with concentrated ammonia and extracted with chloroform. The chloroform extract is washed with water, dried over magnesium sulfate and evaporated. The residue is chromatographed on a silica gel column to obtain α-[3-(morpholinomethyl)phenyl]-α-(2-pyridyl)benzyl alcohol as an oil.

A solution of 15 g. of the free base in diethyl ether is treated with hydrogen chloride gas, and the resulting solids filtered off to obtain α-[3-(morpholinomethyl)phenyl]-α-(2-pyridyl)benzyl alcohol monohydrochloride which decomposes at 125° C.

EXAMPLE 3

α-[2-(morpholinomethyl)phenyl]-α-(2-pyridyl)-p-chlorobenzyl alcohol

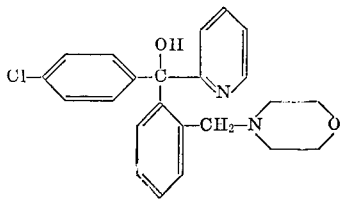

STEP A.—PREPARATION OF 2-p-CHLOROPHENYL-2-o-TOLYL-1,3-DIOXOLANE

To a flask equipped with a Dean-Stark tube is added 44.4 g. of 2-methyl-4'-chlorobenzophenone, 14.1 g. of ethylene glycol, 250 ml. of benzene and 0.5 g. of p-toluenesulfonic acid. The mixture is stirred and refluxed for 48 hours, and the solvent then removed on a rotary evaporator to obtain 2-p-chlorophenyl-2-o-tolyl-1,3-dioxolane as an oil.

STEP B.—PREPARATION OF 2-p-CHLOROPHENYL-2-(o-BROMOMETHYLPHENYL)-1,3-DIOXOLANE

To a flask equipped with a condenser, stirrer, dropping funnel and gas outlet tube is added 27.5 g. of 2-p-chlorophenyl-2-o-tolyl-1,3-dioxolane, 11.6 g. of sodium bicarbonate and 150 ml. of carbon tetrachloride. The resulting mixture is stirred and irradiated with an artificial light source ("Sun Gun") and then 17.6 g. of bromine in 60 ml. of carbon tetrachloride is added dropwise. The mixture is refluxed until the color has faded, and the refluxing continued for an additional two hours thereafter. The resulting mixture is filtered, and the solvent removed from the filtrate in vacuo on a rotary evaporator to obtain 2-p-chlorophenyl-2-(o-bromomethylphenyl)-1,3-dioxolane as an oil.

STEP C.—PREPARATION OF 2-MORPHOLINOMETHYL-4'-CHLOROBENZOPHENONE

To a cooled solution of the oily product obtained in Step B in 150 ml. of carbon tetrachloride is added dropwise a solution of 17.4 g. of morpholine in 70 ml. of carbon tetrachloride. The mixture is stirred overnight at room temperature, then filtered and the carbon tetrachloride layer extracted with 2 N hydrochloric acid. The acidic extract is made basic by the addition of solid sodium carbonate and then extracted with chloroform. The chloroform layer is washed with water, dried over magnesium sulfate and filtered. The filtrate is concentrated on a rotary evaporator, and the residue dissolved in a mixture of 50 ml. of methanol, 5 ml. of water and 10 ml. of concentrated hydrochloric acid. The resulting solution is refluxed for two days, and the solvent then removed on a rotary evaporator. The residue is made basic with 2 N sodium carbonate solution and extracted with chloroform. The chloroform extract is dried over sodium sulfate, filtered and concentrated in vacuo on a rotary evaporator to obtain 2-morpholinomethyl-4'-chlorobenzophenone as an oil.

STEP D.—PREPARATION OF α-[2-(MORPHOLINOMETHYL)PHENYL] - α - (2-PYRIDYL) - p - CHLOROBENZYL ALCOHOL

To a flask equipped with a stirrer, condenser, thermometer, dropping funnel and gas inlet tube is added, under a nitrogen atmosphere, 52 ml. of 15% n-butyllithium in hexane and 100 ml. of anhydrous diethyl ether. The resulting mixture is cooled in a Dry Ice-acetone bath to an internal temperature of —45° C. and then a solution of 16.6 g. of 2-bromopyridine in 25 ml. of diethyl ether is added over a period of 15 minutes. The resulting mixture is stirred for 10 minutes, and then a solution of 9.5 g. of 2-morpholinomethyl-4'-chlorobenzophenone in 150 ml. of diethyl ether is added over a 20-minute period. The cooling bath is then removed and when the internal temperature reaches about −15° C., a solution of 100 ml. of 2 N hydrochloric acid and 50 ml. of water is added dropwise. The aqueous layer is then separated, made basic with concentrated ammonia and extracted with chloroform. The chloroform extract is washed with water, dried over magnesium sulfate and evaporated. The residue is chromatographed on a silica gel column to obtain α-[2-(morpholinomethyl)phenyl] - α - (2-pyridyl)-p-chlorobenzyl alcohol as an oil.

A solution of 2 g. of the free base in chloroform is treated with hydrogen chloride gas, and the resulting solids filtered off to obtain α-[2-(morpholinomethyl)phenyl]-α-(2-pyridyl)-p-chlorobenzyl alcohol monohydrochloride, M.P. 150–155° C.

EXAMPLE 4

α-[3-morpholinomethyl)phenyl]-α-(2-piperidyl)benzyl alcohol

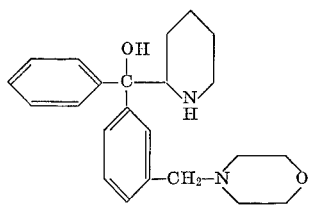

A mixture of 24 g. of α-[3-(morpholinomethyl)phenyl]-α-(2-pyridyl)benzyl alcohol, 200 ml. of acetic acid and 1 g. of platinum dioxide is hydrogenated in a Parr hydrogenation bottle at room temperature and 50 p.s.i.g. for 6 hours. The mixture is then filtered, and the filtrate evaporated in vacuo. The residue is made basic with concentrated ammonia and extracted with chloroform. The chloroform extract is dried over magnesium sulfate, filtered and evaporated. The oily residue (free base) is dissolved in diethyl ether, and the resulting solution treated with hydrogen chloride gas. The solid material is filtered off to obtain α-[3-(morpholinomethyl)phenyl]-α-(2-piperidyl)benzyl alcohol dihydrochloride which decomposes at 192° C.

EXAMPLE 5

α-[4-morpholinomethyl)phenyl]-α-(2-piperidyl)benzyl alcohol

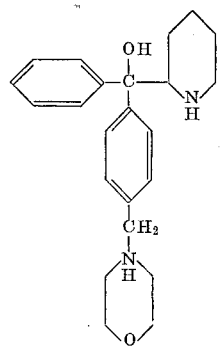

A mixture of 18 g. of α-[4-(morpholinomethyl)phenyl]-α-(2-pyridyl)benzyl alcohol, 200 ml. of acetic acid and 0.5 g. of platinum dioxide is hydrogenated in a Parr hydrogenation bottle at room temperature and 50 p.s.i.g. for 12 hours. The mixture is then filtered, and the filtrate evaporated in vacuo. The residue is made basic with concentrated ammonia and extracted with chloroform. The chloroform extract is dried over magnesium sulfate, filtered and evaporated. The oily residue (free base) is dissolved in diethyl ether, and the resulting solution treated with hydrogen chloride gas. The solid material is filtered off to obtain α-[4-morpholinomethyl)phenyl]-α-(2-piperidyl)benzyl alcohol dihydrochloride which decomposes at 203° C.

EXAMPLE 6

α-[2-morpholinomethyl)phenyl]-α(2-piperidyl)-p-chlorobenzyl alcohol

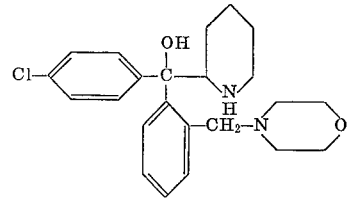

A mixture of 5.5 g. of α-[2-(morpholinomethyl)phenyl]-α-(2-pyridyl)-p-chlorobenzyl alcohol, 150 ml. of acetic acid and 0.2 g. of platinum dioxide is hydrogenated in a Parr hydrogenation bottle at room temperature and 50 p.s.i.g. for 8 hours. The mixture is then filtered, and the filtrate evaporated in vacuo. The residue is made basic with concentrated ammonia and extracted with chloroform extract is dried over magnesium sulfate, filtered and evaporated. The oily residue (free base) is dissolved in diethyl ether, and the resulting solution treated with hydrogen chloride gas. The solid material is filtered off to obtain α-[2-(morpholinomethyl)phenyl]-α-(2-piperidy)-p-chlorobenzyl alcohol dihydrochloride which decomposes 200° C.

EXAMPLE 7

α-[2-(morpholinomethyl)phenyl]benzyl alcohol

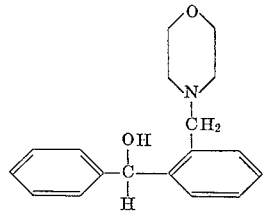

To a flask equipped with a stirrer, dropping funnel, condenser and gas inlet is added 8.0 g. (0.21 mole) of lithium aluminum hydride and 150 ml. of absolute diethyl ether. The system is blanketed with nitrogen and then a solution of 29.5 g. (0.1 mole) of 2-benzoylbenzomorpholide in 500 ml. of diethyl ether is added dropwise with stirring. The resulting mixture is refluxed for 7 hours and then cooled in an ice bath. To the cooled mixture is added dropwise 50 ml. of ethyl acetate, 16 ml. of 2 N sodium hydroxide and 24 ml. of water. The mixture is then filtered, and the filtrate concentrated on a rotary evaporator. The residue is crystallized from pentane to obtain α-[2-(morpholinomethyl)phenyl]benzyl alcohol, M.P. 85–90° C.

EXAMPLE 8

α-[2-(morpholinomethyl)phenyl]-α(2-pyridyl)benzyl alcohol

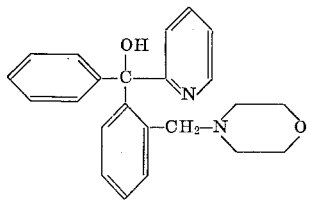

STEP A.—PREPARATION OF 2-PHENYL-2-o-TOLYL-1,3-DIOXOLANE

To a flask equipped with a Dean-Stark tube is added 44.4 g. of 2-methylbenzophenone, 14.1 g. of ethylene glycol, 250 ml. of benzene and 0.5 g. of p-toluenesulfonic acid. The mixture is stirred and refluxed for 48 hours, and the solvent then removed on a rotary evaporator. The residue is crystallized from benzene-heptane to obtain 2-phenyl-2-o-tolyl-1,3-dioxolane, M.P. 73–75° C.

STEP B.—PREPARATION OF 2-PHENYL-2-(o-BROMO-METHYLPHENYL)-1,3-DIOXOLANE

To a flask equipped with a condenser, stirrer, dropping funnel and gas outlet tube is added 45 g. (0.188 mole) of 2-phenyl-2-o-tolyl-1,3-dioxolane, 21 g. (0.25 mole) of sodium bicarbonate and 280 ml. of carbon tetrachloride. The resulting mixture is stirred and irradiated with an artificial light source ("Sun Gun"), and then 10.8 ml. (0.22 mole) of bromine in 95 ml. of carbon tetrachloride is added dropwise. The mixture is refluxed until the color has faded and the refluxing continued for an additional two hours thereafter. The resulting mixture is filtered, and the solvent removed from the filtrate in vacuo on a rotary evaporator to obtain 2-phenyl-2-(o-bromomethylphenyl)-1,3-dioxolane.

STEP C.—PREPARATION OF 2-MORPHOLINOMETHYL-BENZOPHENONE

To a cooled solution of 35.4 g. of 2-phenyl-2-(o-bromomethylphenyl)-1,3-dioxolane in 150 ml. of dichloromethane is added dropwise a solution of 29.0 g. of morpholine in 150 ml. of dichloromethane. The mixture is stirred overnight at room temperature, then filtered and the dichloromethane layer extracted with 2 N hydrochloric acid. The acidic extract is made basic by the addition of solid sodium carbonate and then extracted with chloroform. The chloroform layer is washed with water, dried over magnesium sulfate and filtered. The filtrate is concentrated on a rotary evaporator to obtain 2-morpholinomethylbenzophenone. The base is dissolved in methanol, the resulting solution saturated with hydrogen chloride gas and then treated with anhydrous diethyl ether and then filtered to obtain 2-morpholinomethylbenzophenone hydrochloride, M.P. 180–182° C. (after recrystallization from diethyl ether-ethyl acetate).

STEP D.—PREPARATION OF α-[2-(MORPHOLINOMETH-YL)PHENYL]-α-(2-PYRIDYL)BENZYL ALCOHOL

Following the procedure of Step C of Example 1 and employing an equivalent amount of 2-morpholinomethylbenzophenone in place of the 4-morpholinomethylbenzophenone used therein, there is obtained α-[2-(morpholinomethyl)phenyl]-α-(2-pyridyl)benzyl alcohol.

EXAMPLE 9

α-[3-[-N-(3-azabicyclo(3.2.2.)nonyl)methyl]phenyl]-α-(2-pyridyl)benzyl alcohol

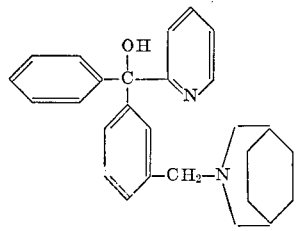

STEP A.—PREPARATION OF 3-[N-(3-AZABICYCLO(3.2.2) NONYL)METHYL]BENZOPHENONE

To a cooled solution of 39 g. of 3-bromomethylbenzophenone in 200 ml. of methylene chloride is added dropwise a solution of 35.4 g. of 3-azabicyclo[3.2.2]nonane in 120 ml. of methylene chloride. The mixture is stirred overnight at room temperature, then filtered and the methylene chloride layer extracted with 2 N hydrochloric acid. The acidic extract is then made basic by the addition of solid sodium carbonate and then extracted with chloroform. The chloroform layer is washed with water, dried over magnesium sulfate and filtered. The filtrate is concentrated on a rotary evaporater to obtain 3-[N-(3-azabicyclo(3.2.2)nonyl)methyl]benzophenone. The free base is dissolved in methanol, the resulting solution saturated with hydrogen chloride gas and then treated with anhydrous diethyl ether and then filtered to obtain 3-[N-(3-azabicyclo(3.2.2)nonyl)methyl]benzophenone hydrochloride, M.P. 187–190° C. (after recrystallization from ethyl acetate-diethyl ether).

STEP B.—PREPARATION OF α-[3-[N-(3-AZABICYCLO(3, NONYL)METHYL]PHENYL]-α - (2-PYRIDYL)BENZYL ALCOHOL

Following the procedure of Step C of Example 1 and employing an equivalent amount of 3-[N-(3-azabicyclo-(3.2.2)nonyl)methyl]benzophenone in place of the 4-morpholinomethylbenzophenone used therein, there is obtained α - [3 - [N - (3-azabicyclo(3.2.2)nonyl)methyl]-phenyl]-α-(2-pyridyl)benzyl alcohol.

EXAMPLE 10

α-[4-[N-(3-azabicyclo(3.2.2)nonyl)methyl]phenyl]-α-(2-pyridyl)benzyl alcohol

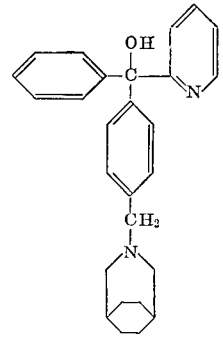

STEP A.—PREPARATION OF 4-[N-(3-AZABICYCLO(3.2.2) NONYL)METHYL]BENZOPHENONE

To a cooled solution of 4-bromomethylbenzophenone in 150 ml. of methylene chloride is added dropwise a solution of 27.3 g. of 3-azabicyclo[3.2.2]nonane in 100 ml. of methylene chloride. The mixture is stirred overnight at room temperature, then filtered and the methylene chloride layer extracted with 2 N hydrochloric acid. The acidic extract is then made basic by the addition of solid sodium carbonate and then extracted with chloroform. The chloroform layer is washed with water, dried over magnesium sulfate and filtered. The filtrate is concentrated on a rotary evaporater to obtain 4-[N-(3-azabicyclo(3.2.2) nonyl)methyl]benzophenone. The free base is dissolved in methanol, the resulting solution saturated with hydrogen chloride gas and then treated with anhydrous diethyl ether and then filtered to obtain 4-[N-(3-azabicyclo(3.2.2)nonyl)methyl]benzophenone hydrochloride, M.P. 253–256° C. (after recrystallization from methanol-water).

STEP B.—PREPARATION OF α-[4-[N-(3-AZABICYCLO-(3.2.2)NONYL)METHYL]PHENYL] - α - (2-PYRIDYL) BENZYL ALCOHOL

Following the procedure of Step C of Example 1 and employing an equivalent amount of 4-[N-(3-azabicyclo(3.2.2)nonyl)methyl]benzophenone in place of the 4-morpholinomethylbenzophenone used therein, there is obtained α - [4 - [N - (3 - azabicyclo(3.2.2)nonyl)methyl] phenyl]-α-(2-pyridyl)benzyl alcohol.

EXAMPLE 11

Following the procedure of Example 4 and employing an equivalent amount of the benzyl alcohols enumerated below in place of the α-[3-(morpholinomethyl)phenyl]-α-(2-pyridyl)benzyl alcohol used therein, there are obtained the products set forth below.

| Benzyl alcohol | Product |
| --- | --- |
| α-[2-(morpholinomethyl)phenyl]-α-(2-pyridy)benzyl alcohol. | α-[2-(morpholinomethyl)phenyl]-α-(2-piperidyl)benzyl alcohol. |
| α-[3-[N-(3-azabicyclo(3.2.2)nonyl) methyl]phenyl]-α-(2-pyridyl)-benzyl alcohol. | α-[3-[N-(3-azabicyclo(3.2.2)nonyl) methyl]phenyl]-α-(2-piperidyl)-benzyl alcohol. |
| α-[4-[N-(3-azabicyclo(3.2.2)nonyl) methyl]phenyl]-α-(2-pyridyl)-benzyl alcohol. | α-[4-[N-(3-azabicyclo(3.2.2)nonyl) methyl]phenyl]-α-(2-piperidyl)-benzyl alcohol. |

EXAMPLE 12

Following the procedures set forth in Steps A–C of Example 1 and employing an equivalent amount of the reactants enumerated below in place of the corresponding reactants used therein, there are obtained the products set forth below.

EXAMPLE 14

Following the procedure of Example 7 and employing an equivalent amount of the products of Step B of Example 12 in place of the 2-benzoylbenzomorpholide used in Example 7, there are obtained the following compounds.

STEP A

| Reactant | Product |
|---|---|
| (a) 5,6-dichloro-3-methylbenzophenone | 5,6-dichloro-3-bromomethylbenzophenone. |
| (b) 2,3′-dichloro-4-methylbenzophenone | 2,3′-dichloro-4-bromomethylbenzophenone. |
| (c) 5-fluoro-3-methylbenzophenone | 5-fluoro-3-bromomethylbenzophenone. |
| (d) 4′-fluoro-4-methylbenzophenone | 4′-fluoro-4-bromomethylbenzophenone. |
| (e) 4′-trifluoromethyl-3-methylbenzophenone | 4′-trifluoromethyl-3-bromomethylbenzophenone. |
| (f) 5-methoxy-3-methylbenzophenone | 5-methoxy-3-bromomethylbenzophenone. |
| (g) 3′-ethoxy-4-methylbenzophenone | 3′-ethoxy-4-bromomethylbenzophenone. |
| (h) 3′,4′-methylenedioxy-3-methylbenzophenone | 3′,4′-methylenedioxy-3-bromomethylbenzophenone. |

STEP B

| Reactant Benzophenone | Amine | Product |
|---|---|---|
| (a) 5,6-dichloro-3-bromomethylbenzophenone | Diethylamine | 5,6-dichloro-3-diethylaminomethylbenzophenone. |
| (b) 2,3′-dichloro-4-bromomethylbenzophenone | Piperidine | 2,3′-dichloro-4-piperidinomethylbenzophenone. |
| (c) 5-fluoro-3-bromomethylbenzophenone | Pyrrolidine | 5-fluoro-3-pyrrolidinomethylbenzophenone. |
| (d) 4′-fluoro-4-bromomethylbenzophenone | 4-methylpiperazine | 4′-fluoro-4-(N-methylpiperazinomethyl)benzophenone. |
| (e) 4′-trifluoromethyl-3-bromomethylbenzophenone | Morpholine | 4′-trifluoromethyl-3-morpholinomethylbenzophenone. |
| (f) 5-methoxy-3-bromomethylbenzophenone | N-methyl-N-ethylamine | 5-methoxy-3-(N-methyl-N-ethylaminomethyl)benzophenone. |
| (g) 3′-ethoxy-4-bromomethylbenzophenone | N-phenylpiperazine | 3′-ethoxy-4-(N-phenylpiperazinomethyl)benzophenone. |
| (h) 3′,4′-methylenedioxy-3-bromomethylbenzophenone | Piperidine | 3′,4′-methylenedioxy-3-piperidinomethylbenzophenone. |

STEP C

| Reactant Benzophenone | Amine | Product |
|---|---|---|
| (a) 5,6-dichloro-3-diethylaminomethylbenzophenone | 2-bromopyridine | α-[5,6-dichloro-3-(diethylaminomethyl)phenyl]-α-(2-pyridyl)benzyl alcohol. |
| (b) 2,3′-dichloro-4-piperidinomethylbenzophenone | 3-bromopyridine | α-[2-chloro-4-(piperidinomethyl)phenyl]-α-(3-pyridyl)-m-chlorobenzyl alcohol. |
| (c) 5-fluoro-3-pyrrolidinomethylbenzophenone | 4-bromopyridine | α-[5-fluoro-3-(pyrrolidinomethyl)phenyl]-α-(4-pyridyl)benzyl alcohol. |
| (d) 4′-fluoro-4-(N-methylpiperazinomethyl)benzophenone | 2-bromopyridine | α-[4-(N-methylpiperazinomethyl)phenyl]-α-(2-pyridyl)-p-fluorobenzyl alcohol. |
| (e) 4′-trifluoromethyl-3-morpholinomethylbenzophenone | 3-bromopyridine | α-[3-(morpholinomethyl)phenyl]-α-(3-pyridyl)-p-trifluoromethylbenzyl alcohol. |
| (f) 5-methoxy-3-(N-methyl-N-ethylaminomethyl)benzophenone | 4-bromopyridine | α-[5-methoxy-3-(N-methyl-N-ethylaminomethyl)phenyl]-α-(4-pyridyl)benzyl alcohol. |
| (g) 3′-ethoxy-4-(N-phenylpiperazinomethyl)benzophenone | 3-bromopyridine | α-[4-(N-phenylpiperazinomethyl)-phenyl]-α-(3-pyridyl)-m-ethoxybenzyl alcohol. |
| (h) 3′,4′-methylenedioxy-3-piperidinomethylbenzophenone | 4-bromopyridine | α-[3-(piperidinomethyl)phenyl]-α-(4-pyridyl)-3,4-methylenedioxybenzyl alcohol. |

EXAMPLE 13

The following the procedure of Example 4 and employing an equivalent amount of the products enumerated in Step C of Example 12 in place of the α-[3-(morpholinomethyl)phenyl] - α - (2 - pyridyl)benzyl alcohol used in Example 4, there are obtained the following compounds.

(a) α-[5,6-dichloro-3-(diethylaminomethyl)phenyl]-α-(2-piperidyl)benzyl alcohol
(b) α-[2-chloro-4-(piperidinomethyl)phenyl]-α-(3-piperidyl)benzyl alcool
(c) α-[5-chloro-3-(pyrrolidinomethyl)phenyl]-α-(4-piperidyl) benzoyl alcohol
(d) α-[4-(N-methylpiperazinomethyl)phenyl]-α-(2-piperidyl)-p-fluorobenzyl alcohol
(e) α-[3-(morpholinomethyl)phenyl]-α-(3-piperidyl) p-trifluoromethylbenzyl alcohol
(f) α-[5-methoxy-3-(N-methyl-N-ethylaminomethyl) phenyl]-α-(4-piperidinyl)benzyl alcohol
(g) α-[4-(N-phenylpiperazinomethyl)phenyl]-α-(3-piperidyl)-m-ethoxybenzyl alcohol
(h) α-[3-(piperidinomethyl)phenyl]-α-(4-piperidyl)-3,4-methylenedioxybenzyl alcohol (a) α-[5,6-dichloro-3-(diethylaminomethyl)phenyl] benzyl alcohol
(b) α-[2-chloro-4-(piperidinomethyl)phenyl]-m-chlorobenzyl alcohol
(c) α-[5-fluoro-3-(pyrrolidinomethyl)phenyl]benzyl alcohol
(d) α-[4-(N-methylpiperazainomethyl)phenyl]-p-fluorobenzyl alcohol
(e) α-[3-(morpholinomethyl)phenyl]-p-trifluoromethylbenzyl alcohol
(f) α-[5-methoxy-3-(N-methyl-N-ethylaminomethyl) phenyl]benzyl alcohol
(g) α-[4-(N-phenylpiperazinomethyl)phenyl]-m-ethoxybenzyl alcohol
(h) α-[3-(piperidinomethyl)phenyl]-3,4-methylenedioxybenzyl alcohol

EXAMPLE 15

Following the procedures set forth in Steps A and B of Example 8 and employing an equivalent amount of the reactants enumerated below in place of the corresponding reactants used therein, there are obtained the products set forth below.

STEP A

| Reactants | | Product |
|---|---|---|
| Benzophenone | Glycol | |
| (1) 5,6-dichloro-3-methylbenzophenone | Ethylene glycol | 2-phenyl-2-(5,6-dichloro-3-methyl)phenyl-1,3-dioxolane. |
| (2) 2,3'-dichloro-4-methylbenzophenone | Propylene glycol | 2-m-chlorophenyl-2-(2-chloro-4-methyl)phenyl-1,3-dioxane. |
| (3) 5-fluoro-3-methylbenzophenone | Ethylene glycol | 2-phenyl-2-(5-fluoro-3-methyl)phenyl-1,3-dioxolane. |
| (4) 4'-fluoro-4-methylbenzophenone | Propylene glycol | 2-p-fluorophenyl-2-p-tolyl-1,3-dioxane. |
| (5) 4'-trifluoromethyl-3-methylbenzophenone | do | 2-p-trifluoromethylphenyl-2-m-tolyl-1,3-dioxane. |
| (6) 5-methoxy-3-methylbenzophenone | Ethylene glycol | 2-phenyl-2-(5-methoxy-3-methyl)phenyl-1,3-dioxolane. |
| (7) 3'-ethoxy-4-methylbenzophenone | Propylene glycol | 2-m-ethoxyphenyl-2-p-tolyl-1,3-dixoane. |
| (8) 3,4-methylenedioxy-3-methylbenzophenone | Ethylene glycol | 2-(3,4-methylenedioxyphenyl)-2-m-tolyl-1,3-dioxolane. |
| (9) 5-chloro-2-methylbenzophenone | Propylene glycol | 2-phenyl-2-(5-chloro-2-methyl)phenyl-1,3-dioxane. |
| (10) 4-methoxy-2-methylbenzophenone | Ethylene glycol | 2-phenyl-2-(4-methoxy-2-methyl)phenyl-1,3-dioxolane. |

STEP B

| Reactants | | Product |
|---|---|---|
| Diox(ol)ane | Halogen source | |
| (1) 2-phenyl-2-(5,6-dichloro-3-methyl)phenyl-1,3-dioxolane | Br₂ | 2-phenyl-2-(5,6-dichloro-3-bromomethyl)phenyl-1,3-dioxolane. |
| (2) 2-m-chlorophenyl-2-(2-chloro-4-methyl)phenyl-1,3-dioxane | Cl₂ | 2-m-chlorophenyl-2-(2-chloro-4-chloromethyl)phenyl-1,3-dioxane. |
| (3) 2-phenyl-2-(5-fluoro-3-methyl)phenyl-1,3-dioxolane | Cl₂ | 2-phenyl-2-(5-fluoro-3-chloromethyl)phenyl-1,3-dioxolane. |
| (4) 2-p-fluorophenyl-2-p-tolyl-1,3-dioxane | Br₂ | 2-p-fluorophenyl-2-p-bromomethylphenyl-1,3-dioxane. |
| (5) 2-p-trifluoromethylphenyl-2-m-tolyl-1,3-dioxane | Br₂ | 2-p-trifluoromethyl-2-m-bromomethylphenyl-1,3-dioxane. |
| (6) 2-phenyl-2-(5-methoxy-3-methyl)phenyl-1,3-dioxolane | Br₂ | 2-phenyl-2-(5-methoxy-3-bromomethyl)phenyl-1,3-dioxolane. |
| (7) 2-m-ethoxyphenyl-2-p-tolyl-1,3-dioxane | Cl₂ | 2-m-ethoxyphenyl-2-p-chloromethylphenyl-1,3-dioxane. |
| (8) 2-(3,4-methylenedioxyphenyl)-2-m-tolyl-1,3-dioxolane | Br₂ | 2-(3,4-methylenedioxyphenyl)-2-m-bromomethylphenyl-1,3-dioxolane. |
| (9) 2-phenyl-2-(5-chloro-2-methyl)phenyl-1,3-dioxane | Cl₂ | 2-phenyl-2-(5-chloro-2-chloromethyl)phenyl-1,3-dioxane. |
| (10) 2-phenyl-2-(4-methoxy-2-methyl)phenyl-1,3-dioxolane | Cl₂ | 2-phenyl-2-(4-methoxy-2-chloromethyl)phenyl-1,3-dioxolane. |

EXAMPLE 16

2-dimethylaminomethylbenzophenone

To a cooled solution of 72.5 g. of 2-phenyl-2-(o-bromomethylphenyl)-1,3-dioxolane in 200 ml. of carbon tetrachloride is added dropwise a solution of 20.7 g. of dimethylamine in 200 ml. of carbon tetrachloride. The mixture is stirred overnight at room temperature, then filtered and the carbon tetrachloride layer extracted with 2 N hydrochloric acid. The acidic extract is made basic by the addition of solid sodium carbonate and then extracted with chloroform. The chloroform layer is washed with water, dried over magnesium sulfate and filtered. The filtrate is concentrated on a rotary evaporator to obtain 2-dimethylaminomethylbenzophenone as an oil.

EXAMPLE 17

2-(N-methylpiperazinomethyl)benzophenone

To a cooled solution of 72.5 g. of 2-phenyl-2-(o-bromomethylphenyl)-1,3-dioxolane in 200 ml. of carbon tetrachloride is added dropwise a solution of 46 g. of 1-methylpiperazine in 150 ml. of carbon tetrachloride. The mixture is stirred overnight at room temperature, then filtered and the carbon tetrachloride layer extracted with 2 N hydrochloric acid. The acidic extract is made basic by the addition of solid sodium carbonate and then extracted with chloroform. The chloroform layer is washed with water, dried over magnesium sulfate and filtered. The filtrate is concentrated on a rotary evaporator to obtain 2-(N-methylpiperazinomethyl)benzophenone as an oil.

EXAMPLE 18

2-(N-phenylpiperazinomethyl)benzophenone

To a cooled solution of 72.5 g. of 2-phenyl-2-(o-bromomethylphenyl)-1,3-dioxolane in 200 ml. of carbon tetrachloride is added dropwise a solution of 74.5 g. of N-phenylpiperazine in 150 ml. of carbon tetrachloride. The mixture is stirred overnight at room temperature, then filtered and the carbon tetrachloride layer extracted with 2 N hydrochloric acid. The acidic extract is made basic by the addition of solid sodium carbonate and then extracted with chloroform. The chloroform layer is washed with water, dried over magnesium sulfate and filtered. The filtrate is concentrated on a rotary evaporator to obtain 2-(N-phenylpiperazinomethyl)benzophenone as an oil.

A solution of 13 g. of the free base in 300 ml. of diethyl ether is saturated with hydrogen chloride gas, the resulting solids filtered off and recrystallized from absolute ethanol-methanol to obtain 2-(N-phenylpiperazinomethyl)benzophenone dihydrochloride, M.P. 229–230° C.

What is claimed is:

1. A compound selected from the group of benzyl alcohols of the formula

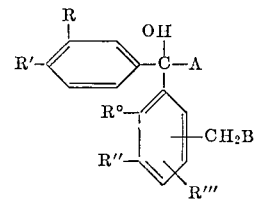

and the pharmaceutically acceptable acid addition and quaternary salts thereof, wherein
each of R and R' represents hydrogen, chloro, fluoro, trifluoromethyl or lower alkoxy of 1–4 carbon atoms; or
R and R' together form a 3,4-methylenedioxy bridge;
each of R" and R'" represents hydrogen, chloro, fluoro, trifluoromethyl or lower alkoxy of 1–4 carbon atoms; or R" and R'" together form a 2,3- or 3,4-methylenedioxy bridge;
R° represents hydrogen;
A represents pyridyl or C-piperidyl; and
B represents di(straight-chain lower alkyl)amino, wherein straight chain lower alkyl of 1–4 carbon atoms, morpholino, pyrrolidino or piperidino.

2. The compound of claim 1 which is α-[4-(morpholinomethyl)phenyl]-α-(2-pyridyl)benzyl alcohol.

3. The compound of claim 1 which is α-[3-(morpholinomethyl)phenyl]-α-(2-pyridyl)benzyl alcohol.

4. The compound of claim 1 which is α-[2-(morpholinomethyl)phenyl] - α - (2-pyridyl)-p-chlorobenzyl alcohol.

5. The compound of claim 1 which is α-[4-(morpholinomethyl)phenyl]-α-(2-piperidyl)benzyl alcohol.

6. The compound of claim 1 which is α-[3-(morpholinomethyl)phenyl]-α-(2-piperidyl)benzyl alcohol.

7. The compound of claim 1 which is α-[2-(morpholinomethyl)phenyl]-α-(2-piperidyl)-p-chlorobenzyl alcohol.

8. The compound of claim 1 which is α-[2-(morpholinomethyl)phenyl]-α-(2-pyridyl)benzyl alcohol.

No references cited.

ALEX MAZEL, Primary Examiner

J. TOVAR, Assistant Examiner

U.S. Cl. X.R.

260—243 B, 247.1, 247.2, 268 H, 293.4 A, 294 S, 294.8 R, 297 R, 294.7 G; 424—48